(12) United States Patent
Takahashi et al.

(10) Patent No.: US 12,080,915 B2
(45) Date of Patent: Sep. 3, 2024

(54) ELECTRICAL JUNCTION BOX

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hideo Takahashi, Mie (JP); Hideaki Nakajima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 610 days.

(21) Appl. No.: 17/311,454

(22) PCT Filed: Dec. 6, 2019

(86) PCT No.: PCT/JP2019/047750
§ 371 (c)(1),
(2) Date: Jun. 7, 2021

(87) PCT Pub. No.: WO2020/137438
PCT Pub. Date: Jul. 2, 2020

(65) Prior Publication Data
US 2022/0029249 A1    Jan. 27, 2022

(30) Foreign Application Priority Data
Dec. 25, 2018   (JP) ................................ 2018-241130

(51) Int. Cl.
*H01M 50/507*    (2021.01)
*H01M 50/204*    (2021.01)
(Continued)

(52) U.S. Cl.
CPC ....... *H01M 50/507* (2021.01); *H01M 50/204* (2021.01); *H01M 50/227* (2021.01); *H01M 50/262* (2021.01); *H01M 50/50* (2021.01)

(58) Field of Classification Search
CPC .................................................. H01M 50/507
See application file for complete search history.

(56) References Cited

U.S. PATENT DOCUMENTS 10,957,895 B2 *   3/2021   Yanagida ............ H01M 50/503
2015/0380699 A1   12/2015  Ikeda et al.
(Continued)

FOREIGN PATENT DOCUMENTS

JP      2013-168260     8/2013
JP      2014-175291     9/2014
(Continued)

OTHER PUBLICATIONS

Official Communication issued in International Bureau of Wipo Patent Application No. PCT/JP2019/047750, dated Feb. 18, 2020, along with an English translation thereof.

*Primary Examiner* — Karie O'Neill Apicella
(74) *Attorney, Agent, or Firm* — Greenblum & Bernstein, P.L.C.

(57) ABSTRACT

A connection module includes multiple bus bars for connecting electrode terminals of adjacent power storage elements, and a holding member that holds the multiple bus bars. The holding member includes multiple holding units that respectively hold the multiple bus bars and are arranged side by side in one line, and the holding units include shielding walls. The shielding wall included on one first holding unit is provided in a standing manner along only the short side of the bus bar held in the first holding unit, the short side opposing another adjacent first holding unit or second holding unit.

6 Claims, 14 Drawing Sheets

(51) Int. Cl.
  *H01M 50/227* (2021.01)
  *H01M 50/262* (2021.01)
  *H01M 50/50* (2021.01)

(56) References Cited

U.S. PATENT DOCUMENTS

2017/0110705 A1 4/2017 Tosaya et al.
2019/0252739 A1 8/2019 Mizuno et al.

FOREIGN PATENT DOCUMENTS

JP 2016-024933 2/2016
JP 2018-081875 5/2018

\* cited by examiner

ELECTRICAL JUNCTION BOX

TECHNICAL FIELD

The technique disclosed by the present specification relates to a connection module.

BACKGROUND ART

A power storage device for an electric automobile or a hybrid vehicle includes a battery pack constituted by multiple single batteries, and a connection module that is attached to the battery pack and is for connecting the multiple single batteries. The connection module includes bus bars for connecting cathodes and anodes of adjacent single batteries, and resin housings for holding the bus bars. The housings have a box shape that includes a bottom wall and a peripheral wall. The bus bars are held inside of the housings and are surrounded on four sides by the peripheral walls.

CITATION LIST

Patent Documents

Patent Document 1: JP 2013-168260A

SUMMARY OF INVENTION

Technical Problem

In recent years, in the field of automobiles, reduction of the weight of mounted parts and reduction of the material cost have been requested for the purpose of improvement of fuel efficiency, cost reduction, and the like.

Solution to Problem

A connection module disclosed by the present specification is a connection module to be attached to a plurality of power storage elements including electrode terminals, the connection module including: a plurality of connection members for connecting adjacent said electrode terminals; and a holding member that holds the plurality of connection members, in which the holding member includes a plurality of holding units that respectively hold the plurality of connection members and are arranged side by side in one line, the holding units each include a shielding wall, and the shielding wall included in one said holding unit is provided in a standing manner along only an opposing edge of one said connection member held in the one holding unit, the opposing edge opposing another said holding unit adjacent thereto.

As described above, in order to shield the one connection member held in the one holding unit from the other connection member, the shielding wall need only be provided in a standing manner along only the opposing edge of the one connection member, the opposing wall opposing the other adjacent holding unit. According to this kind of configuration, compared to the configuration in which the connection member is surrounded on four sides by the peripheral wall, it is possible to conserve the material of the holding member, the weight can be reduced accordingly, and the material cost can also be reduced.

In the above-described configuration, the shielding wall included in the one holding unit may also be provided in a standing manner along only one of a pair of the opposing edges of the one connection member, the opposing edges opposing the other holding units arranged on both sides of the one holding unit.

According to this kind of configuration, one of the pair of opposing edges of the one connection member included in the one holding unit is shielded from the other connection member held in the adjacent holding unit by the shielding wall included in the holding unit. Also, the other opposing edge can be shielded from the connection member held in the adjacent holding unit using the shielding wall of the other holding unit arranged adjacent thereto. Accordingly, the connection member can be shielded from the other adjacent connection member by the minimum required number of shielding walls.

In the above-described configuration, the holding unit may also include a contact wall that is in contact with the connection member, and a plurality of locking portions that engage with the connection member, and one of the plurality of locking portions may also protrude from the contact wall, and another one may protrude from the shielding wall.

According to this kind of configuration, the connection member can be held in the holding unit with a simple configuration.

In the above-described configuration, the connection member may also have a plurality of engagement recesses, the holding unit may also include a plurality of guide ribs that fit into the engagement recesses and guide attachment of the connection member to the holding unit, one of the plurality of guide ribs may also be a first guide rib that protrudes from the shielding wall, and another one may be a second guide rib that protrudes from the contact wall, and a height of the first guide rib from the contact wall may also be higher than a height of the second guide rib from the contact wall.

According to this kind of configuration, it is possible to smoothly attach the connection member to the holding unit by first positioning and guiding the connection member using the first guide rib and the shielding wall, and then performing guiding while suppressing rotation of the connection member using the second guide rib.

Advantageous Effects of Invention

According to the connection module disclosed by the present specification, it is possible to realize a reduction of the weight of the holding member and a reduction of the material cost.

DESCRIPTION OF EMBODIMENTS

Embodiment

Figure 1:
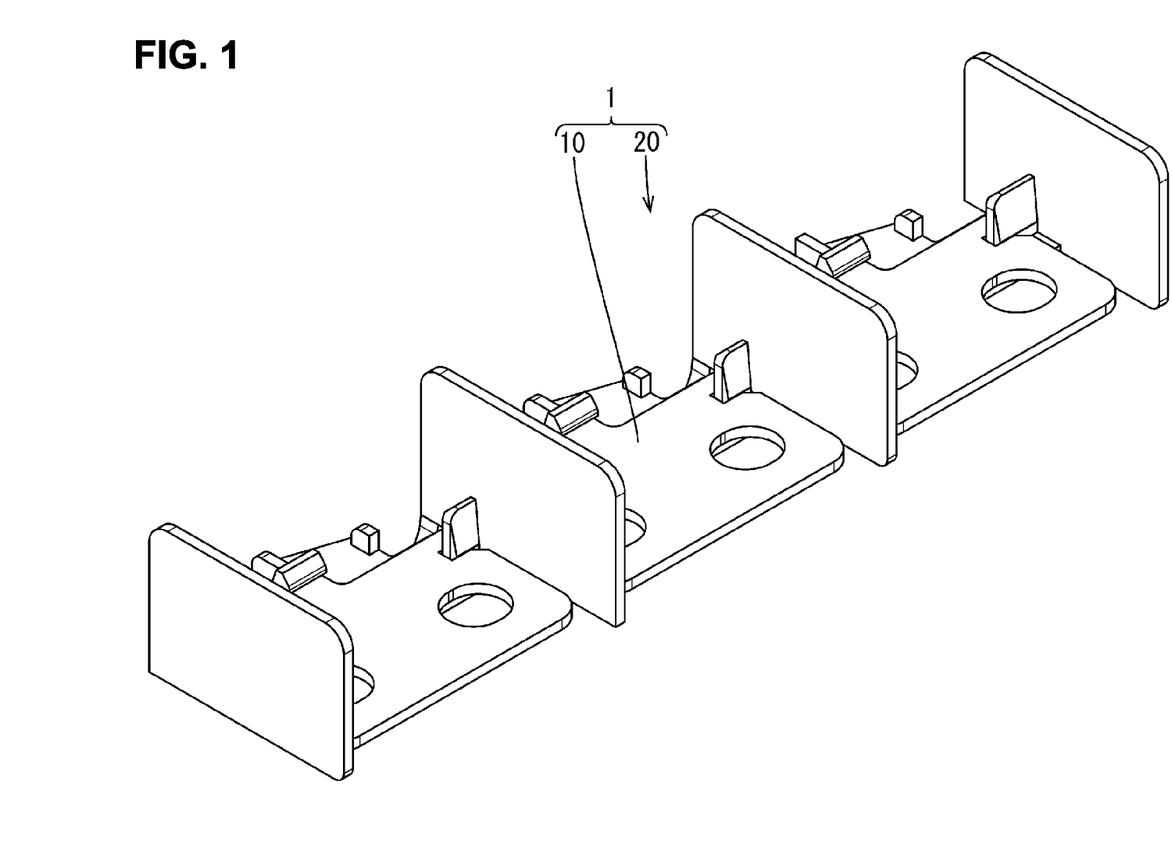
FIG. 1 is a perspective view of a connection module of an embodiment.

An embodiment will be described with reference to FIGS. 1 to 12. A connection module 1 of the present embodiment is attached to a power storage element group to be used as a drive source of a vehicle such as an electric automobile or a hybrid automobile, and connects multiple power storage elements in series. As shown in FIG. 1, this connection module 1 includes multiple bus bars 10 (corresponds to connection members) and a holding member 20 that holds the multiple bus bars 10.

Bus Bar 10

Figure 6:
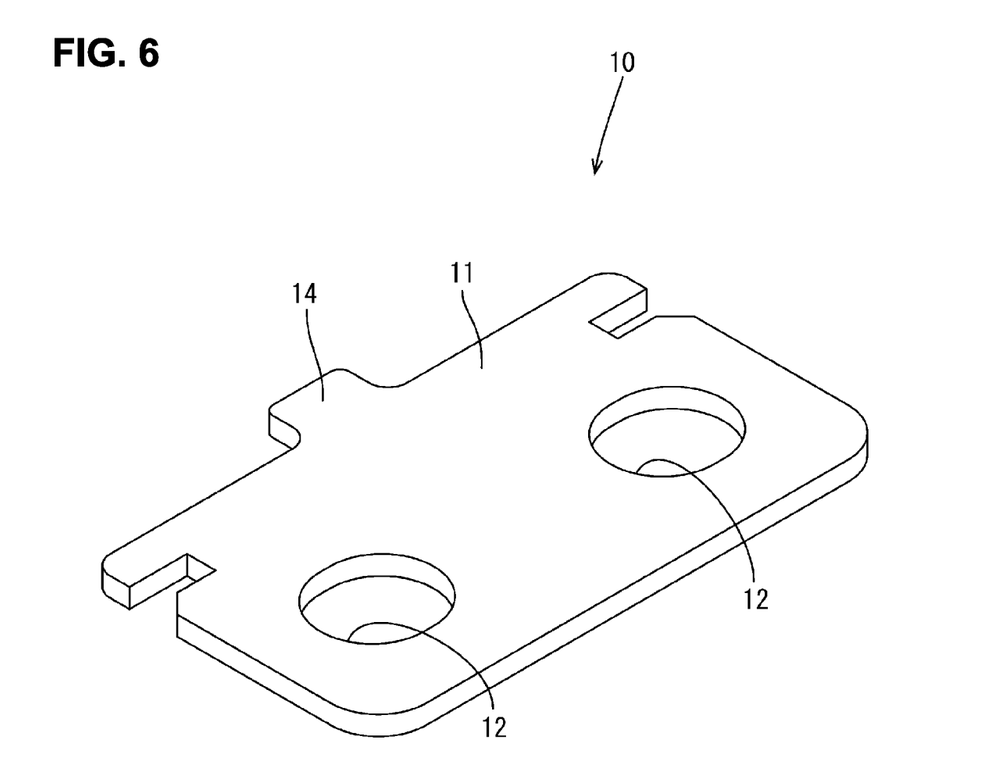
FIG. 6 is a perspective view of a bus bar of the embodiment.
Figure 7:
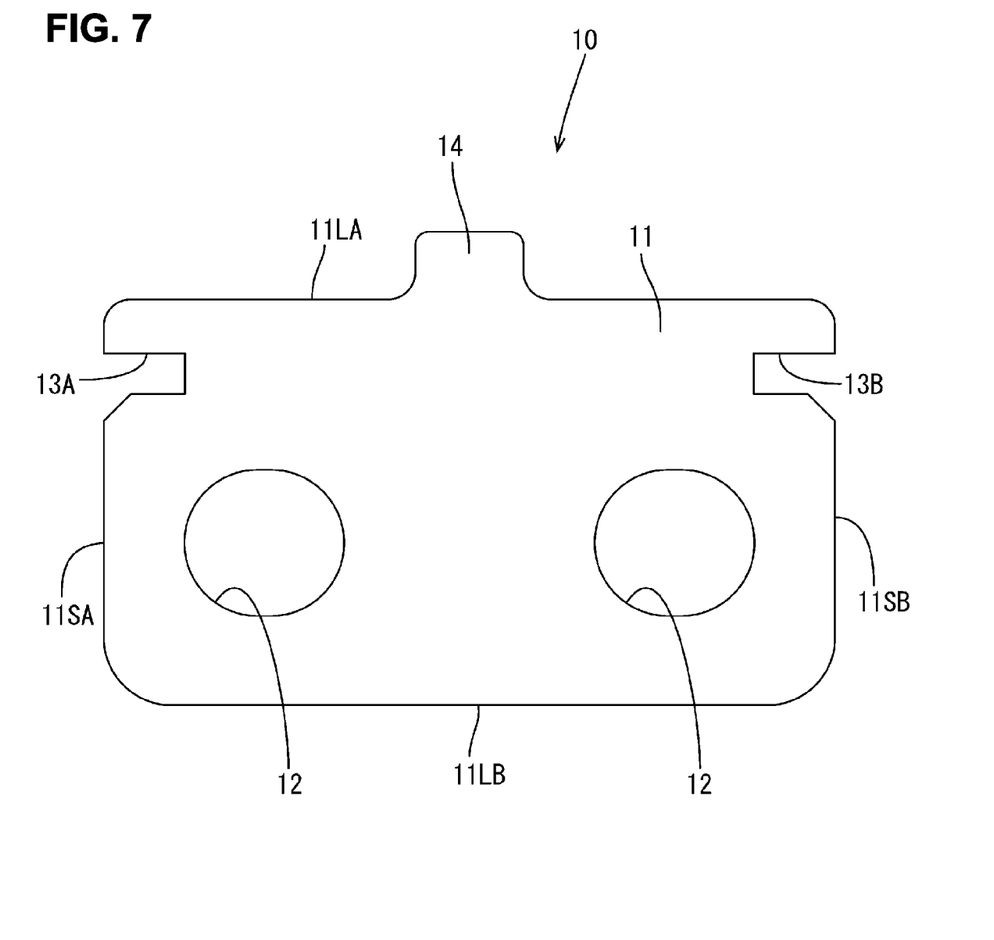
FIG. 7 is a plan view of the bus bar of the embodiment.

Each of the multiple bus bars 10 is made of metal, and as shown in FIGS. 6 and 7, includes an electrode connection portion 11 for connecting a positive electrode terminal and a negative electrode terminal of adjacent power storage elements, and a locking protrusion 14 that is continuous from the electrode connection portion 11.

The electrode connection portion 11 is an overall rectangular plate-shaped portion, and as shown in FIG. 7, has a pair of short sides 11SA and 11SB (corresponds to opposing edges), and a pair of long sides 11LA and 11LB that are orthogonal to the pair of short sides 11SA and 11SB. Also, the electrode connection portion 11 has two electrode insertion holes 12 through which a positive electrode terminal and a negative electrode terminal can be inserted, and two engagement recesses 13A and 13B for engaging with the holding member 20. One of the two engagement recesses 13A and 13B is a first engagement recess 13A that is recessed from the short side 11SA, and the other is a second engagement recess 13B that is recessed from the short side 11SB.

The locking protrusion 14 is a rectangular plate piece-shaped portion that extends in the same plane as the electrode connection portion 11 from the long side 11LA.

Holding Member 20

Figure 9:
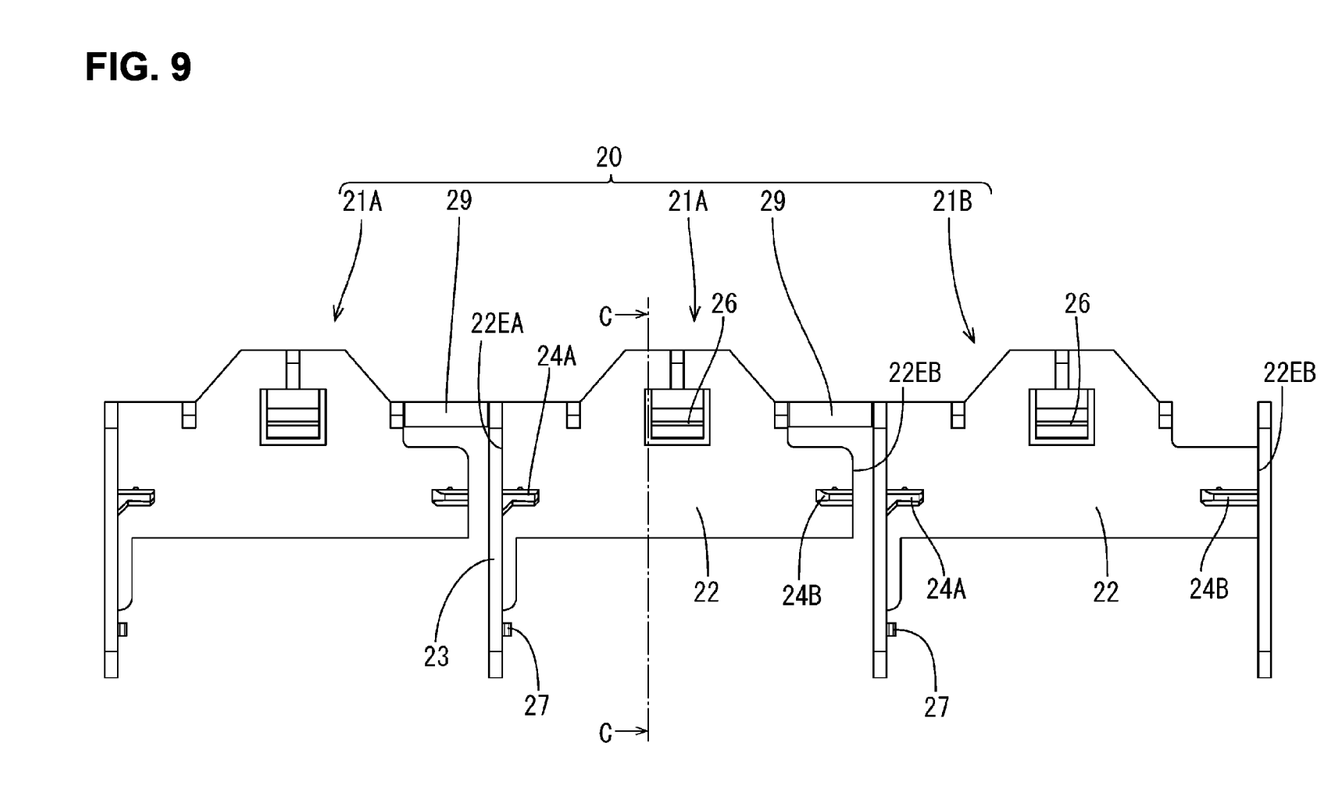
FIG. 9 is a plan view of the holding member of the embodiment.

The holding member 20 is made of a synthetic resin, and as shown in FIG. 9, includes multiple holding units 21A and 21B, and joining portions 29 for joining the adjacent holding units 21A and 21B. The multiple holding units 21A and 21B are arranged side by side in one row. One of the multiple holding units 21A and 21B that is arranged at one end (the right end in FIG. 9) is a second holding unit 21B, and the rest are first holding units 21A.

As shown in FIG. 9, each of the first holding units 21A includes a contact wall 22, a shielding wall 23, two guide ribs (a first guide rib 24A and a second guide rib 24B), a locking piece 26 (corresponds to a locking portion), and a locking projection 27 (corresponds to a locking portion).

Figure 3:
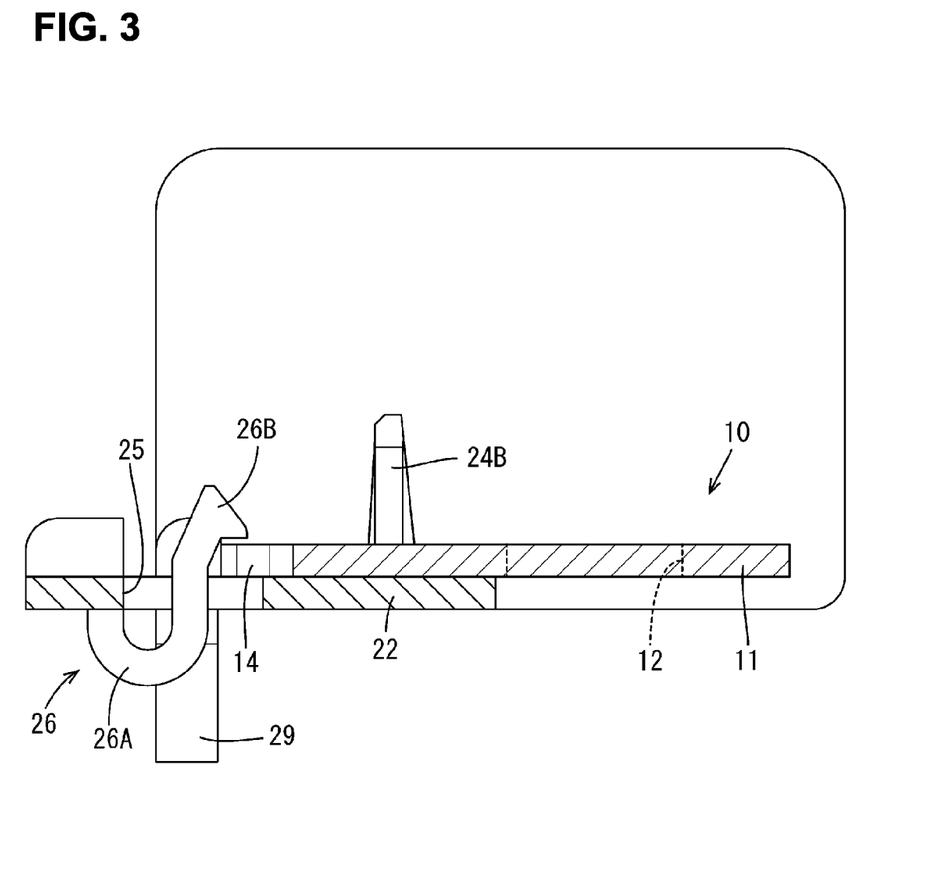
FIG. 3 is a cross-sectional view taken along line A-A of FIG. 2.
Figure 4:
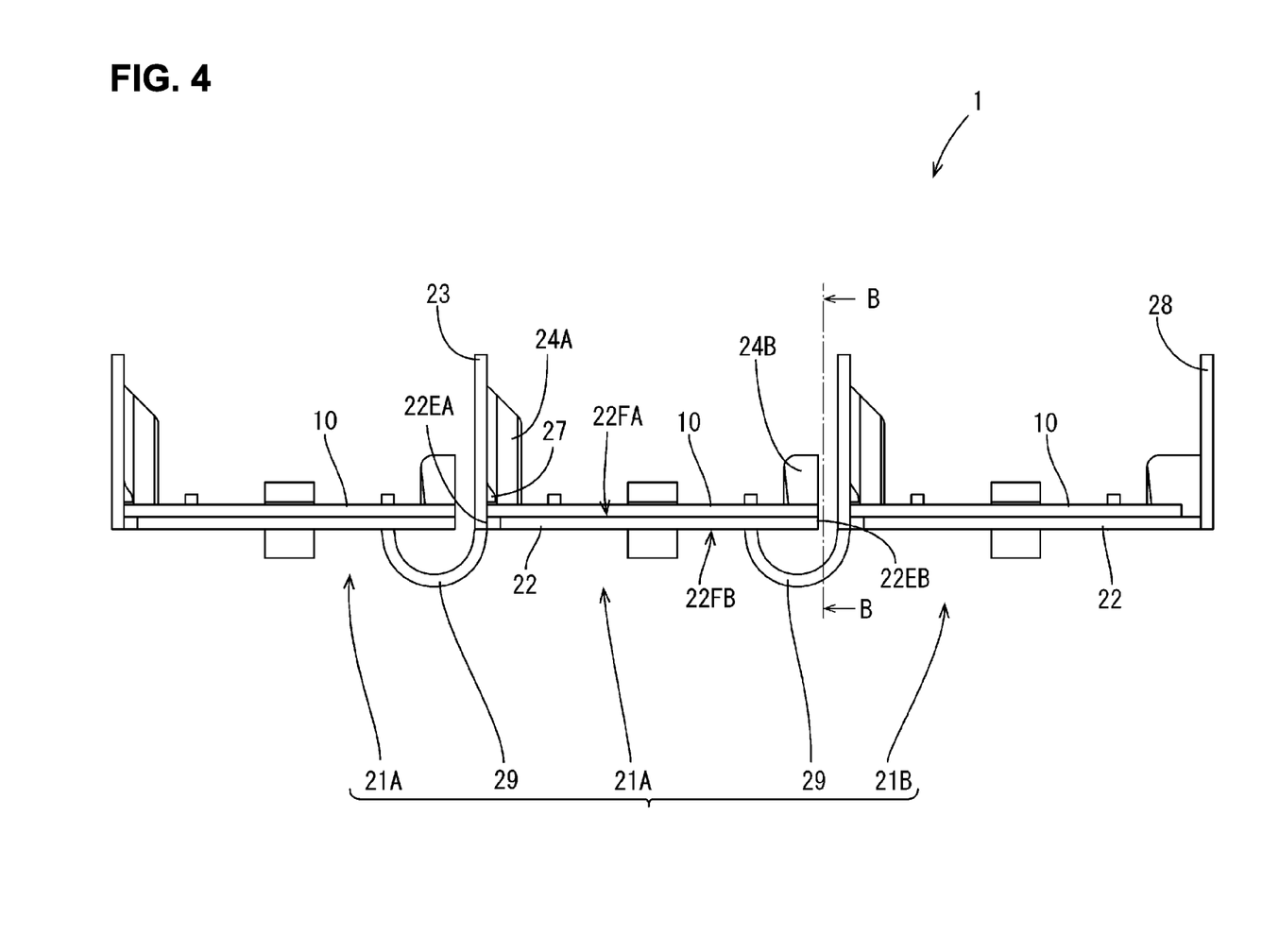
FIG. 4 is a front view of the connection module of the embodiment.

The contact wall 22 is a plate-shaped member that supports a bus bar 10, and as shown in FIGS. 4 and 9, has two edges 22EA and 22EB that are respectively adjacent to the holding units 21A and 21B on both sides. One surface of the contact wall 22 (the upper surface in FIG. 4) is a contact surface 22FA that comes into contact with the bus bar 10. As shown in FIG. 3, the contact wall 22 comes into contact with the bus bar 10 away from the arrangement position of an electrode insertion hole 12.

Figure 2:
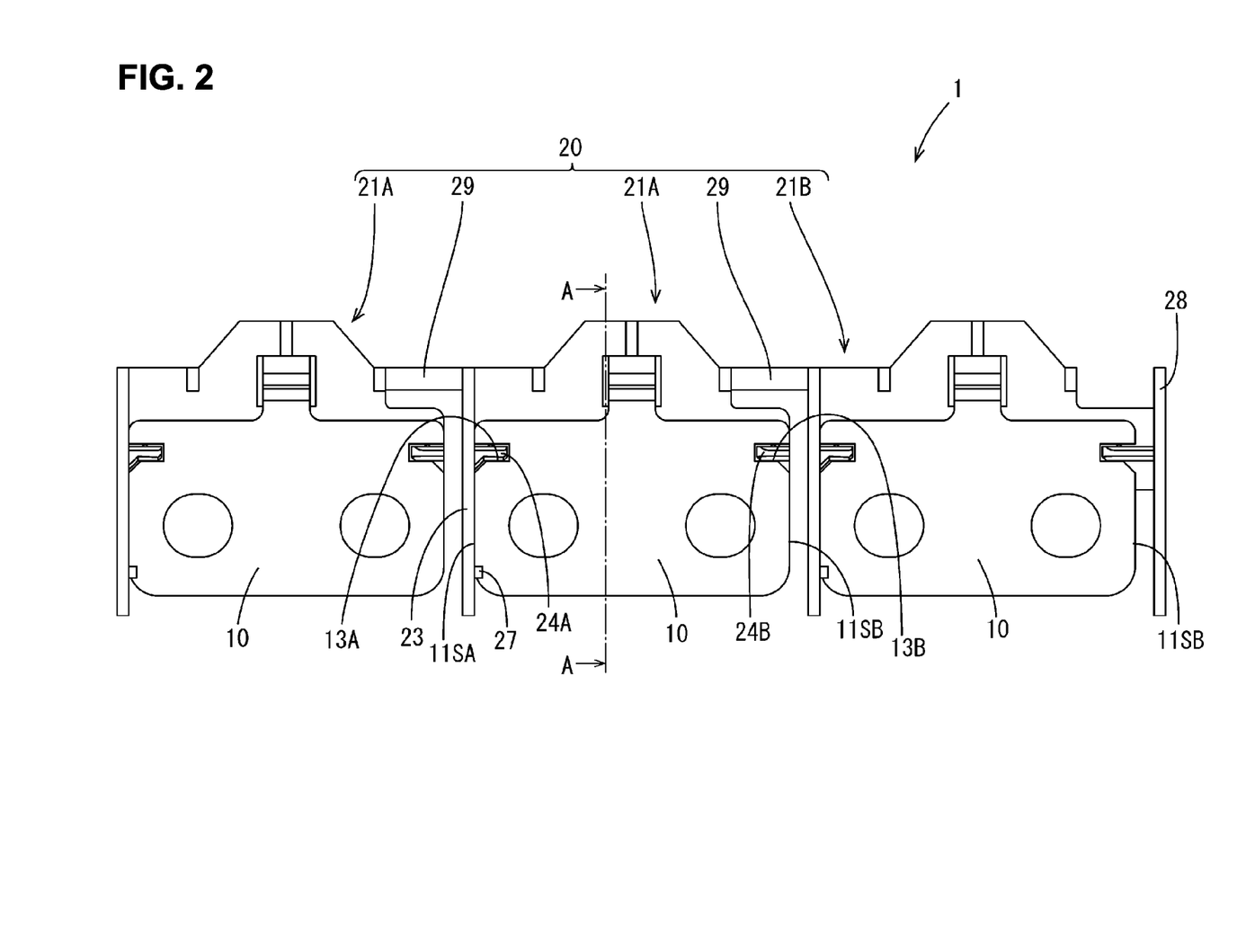
FIG. 2 is a plan view of the connection module of the embodiment.
Figure 8:
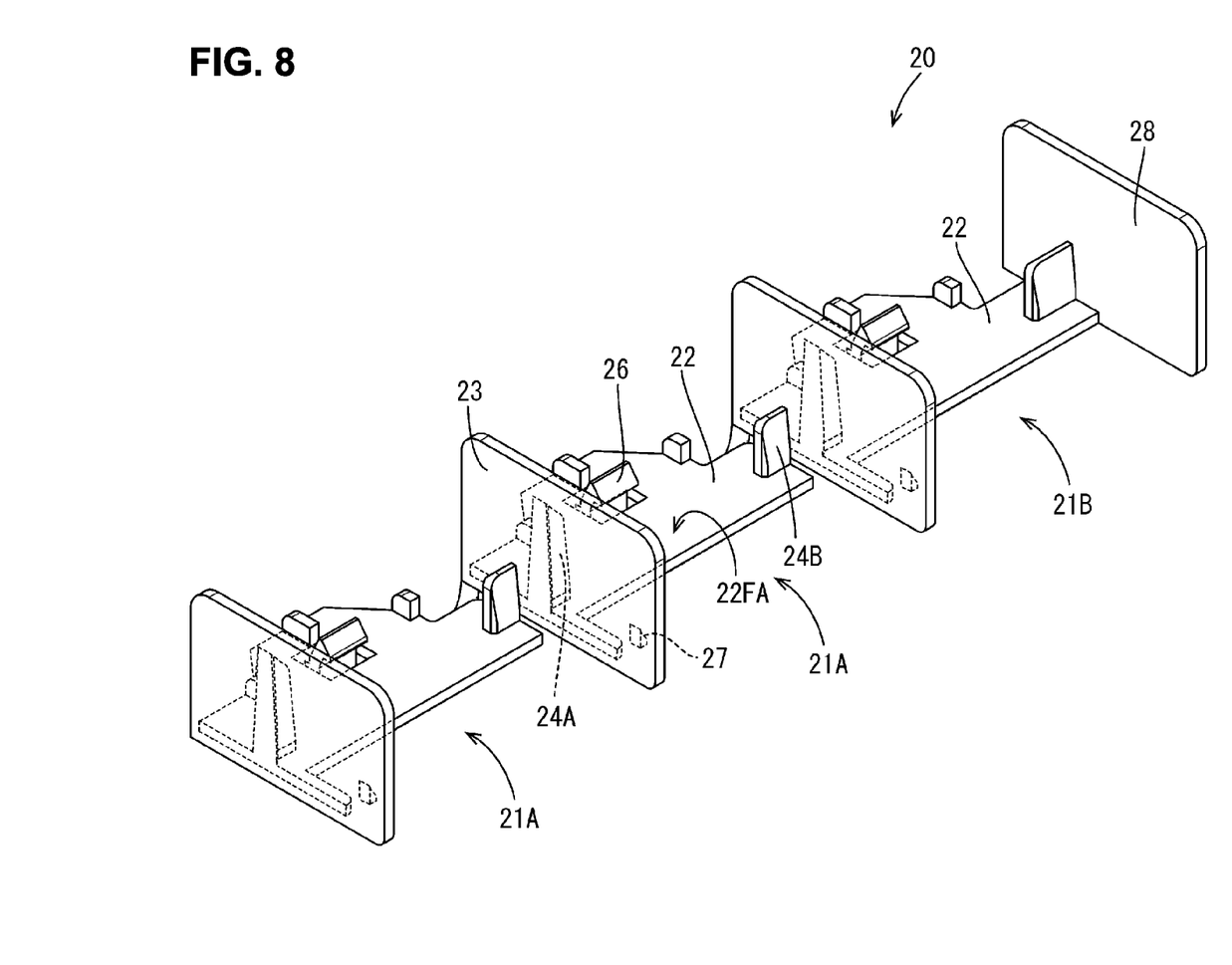
FIG. 8 is a perspective view of a holding member of the embodiment.

As shown in FIGS. 4, 8, and 9, the shielding wall 23 is a wall that extends orthogonally to the contact surface 22, and is connected to one edge 22EA of the contact wall 22. As shown in FIG. 2, the shielding wall 23 is arranged along a short side 11SA of the bus bar 10 attached to the first holding unit 21A and covers the entire length of the short side 11SA. The bus bar 10 is shielded from the bus bar 10 held in the adjacent first holding unit 21A (on the left side in FIGS. 2 and 4) by the shielding wall 23. There is only one shielding wall 23 included in each first holding unit 21A, and the shielding wall 23 is arranged along one short side 11SA of the bus bar 10.

Figure 5:
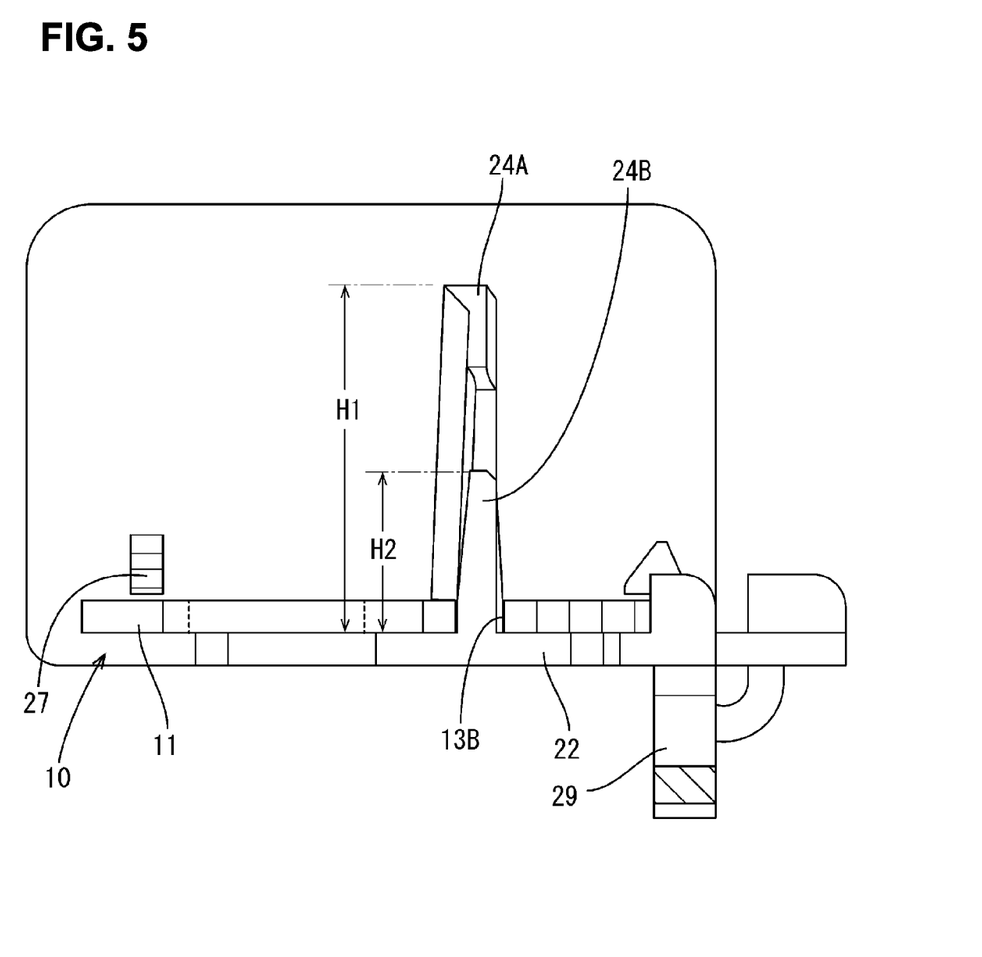
FIG. 5 is a cross-sectional view taken along line B-B of FIG. 4.

As shown in FIGS. 4, 8, and 9, the first guide rib 24A is a strip-shaped wall that protrudes orthogonally from the shielding wall 23 and extends in a direction orthogonal to the contact wall 22, and one end of the first guide rib 24A is connected to the contact surface 22FA. As shown in FIG. 8, the second guide rib 24B is a band-shaped portion that extends orthogonally from the contact surface 22FA of the contact wall 22. As shown in FIG. 2, the first guide rib 24A and the second guide rib 24B guide the attachment of the bus bar 10 to the first holding unit 21A by respectively fitting into the two engagement recesses 13A and 13B of the bus bar 10. As shown in FIG. 5, a height H1 of the first guide rib 24A from the contact wall 22 (distance from the contact wall 22 to the edge on the side opposite to the contact wall 22 in the first guide rib 24A) is greater than a height H2 of the second guide rib 24B from the contact wall 22 (distance from the contact wall 22 to the edge on the side opposite to the contact wall 22 in the second guide rib 24B).

Figure 10:
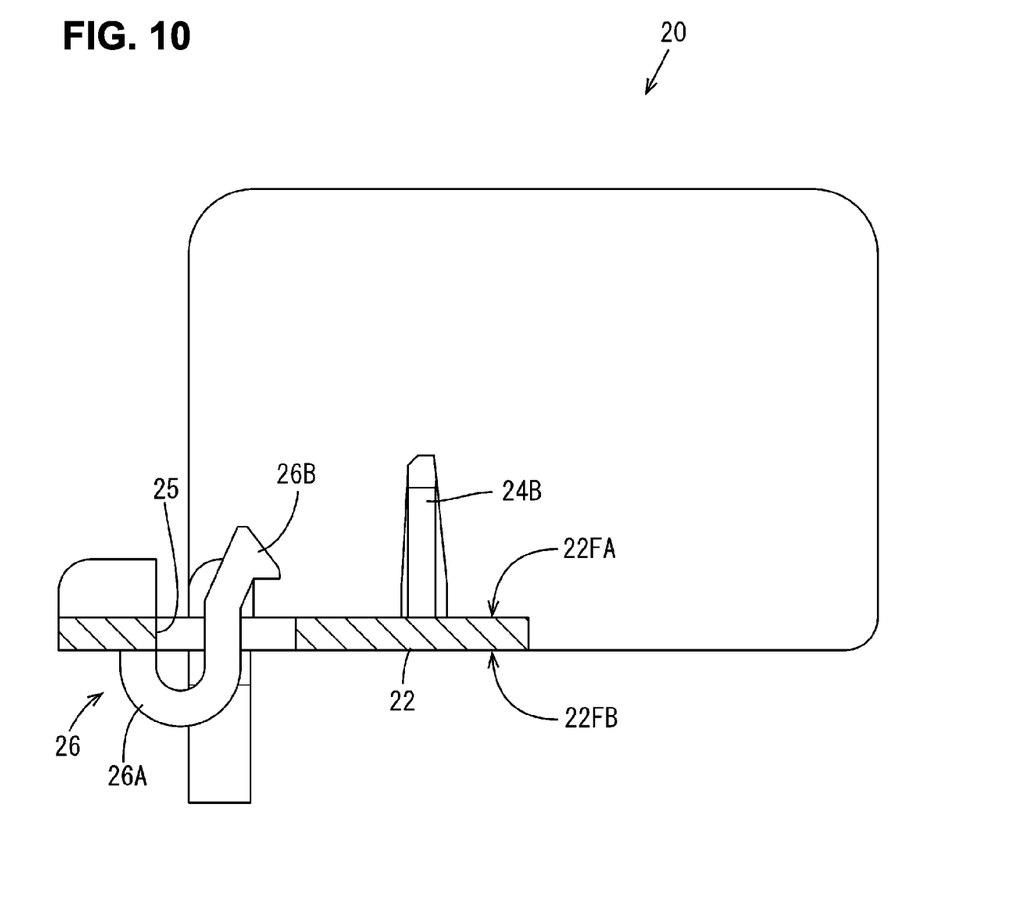
FIG. 10 is cross-sectional view taken along line C-C of FIG. 9.
Figure 11:
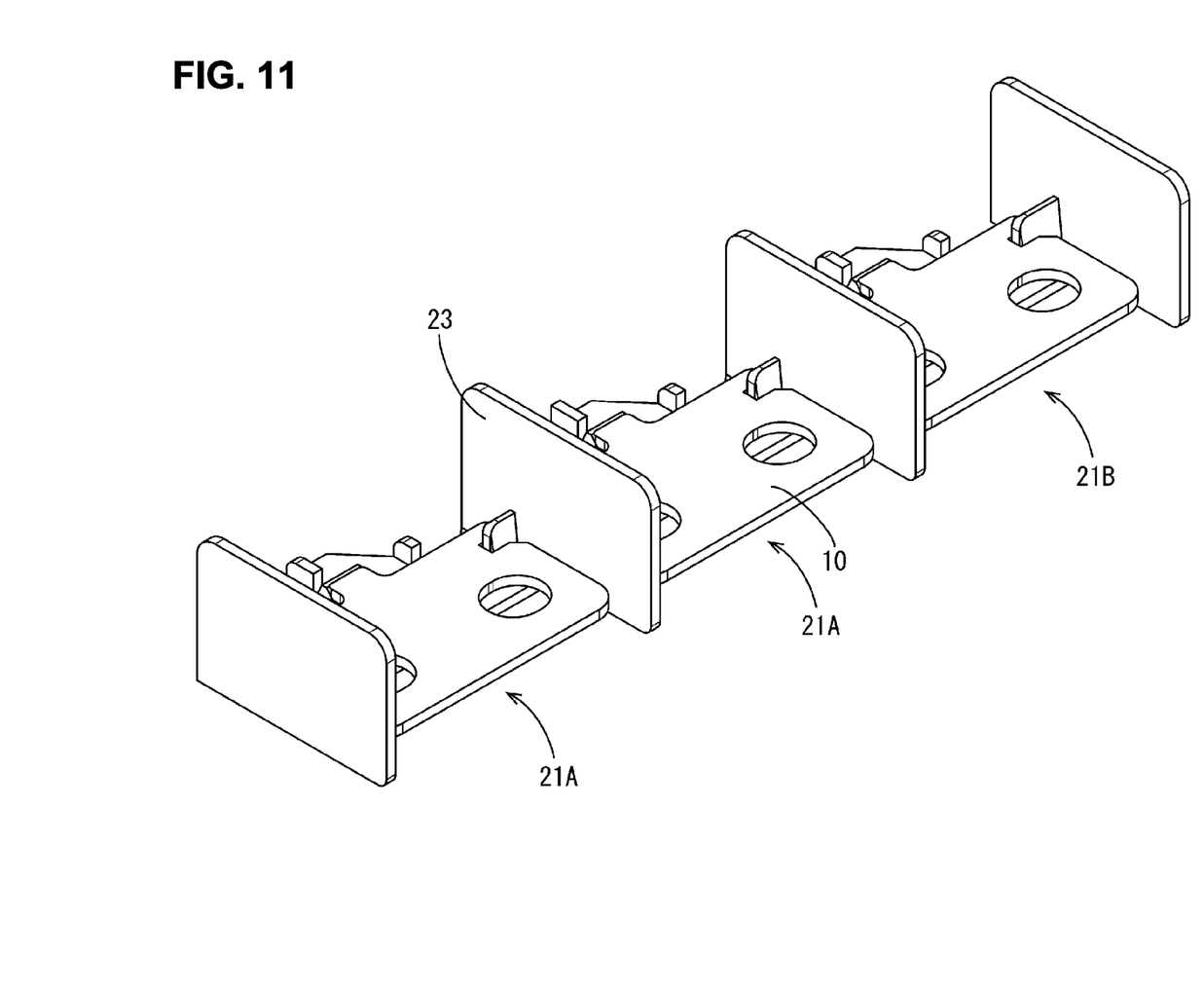
FIG. 11 is a perspective view showing a state during attachment of the bus bar to the holding member in the embodiment.

As shown in FIG. 10, the contact wall 22 has a locking piece insertion hole 25, and the locking piece 26 includes a bending piece 26A in the form of a plate spring that extends from the other surface 22FB (lower surface in FIG. 10) on the side opposite to the contact surface 22FA in the contact wall 22, is folded back into a U shape, and protrudes from the locking piece insertion hole 25, and a locking claw 26B that protrudes from the extension end of the bending piece 26A and engages with the bus bar 10.

As shown in FIGS. 8 and 9, the locking projection 27 is a projection that protrudes from the shielding wall 23 and engages with the bus bar 10.

The second holding unit 21B differs from the first holding unit 21A in that it includes an end portion shielding wall 28. As shown in FIGS. 4, 8, and 9, the end portion shielding wall 28 is a wall that extends orthogonally to the contact wall 22, and is connected to the other edge 22EB of the contact wall 22. As shown in FIG. 2, the end portion shielding wall 28 is arranged along the other short side 11SB of the bus bar 10 held in the second holding unit 21B, and covers the entire length of the short side 11SB. Since other configurations are the same as those of the first holding unit 21A, the same configurations are denoted by identical reference numerals and description thereof is omitted.

As shown in FIG. 4, the joining portion 29 is a portion in the form of a U-shaped plate spring that extends from the shielding wall 23 of the first holding unit 21A and connects to the other surface 22FB of the contact wall 22 of the other adjacent holding units 21A and 21B. The joining portion 29 is allowed to deform such that U-shaped vertical bar portions move toward and away from each other. There is a gap between the one first holding unit 21A and the other first holding unit 21A or second holding unit 21B adjacent thereto, and the adjacent first holding units 21A or the first holding unit 21A and the second holding unit 21B are allowed to be displaced so as to move toward and away from each other due to the deformation of the joining portion 29. This makes it possible to adjust the interval of the adjacent holding units 21A and 21B in accordance with a dimensional tolerance that occurs due to dimensional error during manufacture of the power storage elements, attachment error of the multiple power storage elements, and the like during attachment of the connection module 1 to the power storage element group.

Attachment of Bus Bars 10 to Holding Member 20

An example of a procedure for attaching the above-described bus bars 10 to the holding member 20 to manufacture the connection module 1 will be described hereinafter.

The bus bars 10 are attached to the first holding units 21A. The bus bar 10 is held in an orientation that is parallel to the contact wall 22, and the first guide rib 24A is inserted into the first engagement recess 13A while the short side 11SA is made to conform with the shielding wall 23, and thus the bus bar 10 is positioned. By first positioning the edge 11SA of the bus bar 10 using the shielding wall 23 and the first guide rib 24A in this manner, it is possible to easily perform the task of attaching the bus bar 10.

Next, when the bus bar 10 is pressed in toward the contact wall 22 while being guided by the first guide rib 24A, the second guide rib 24B enters the second engagement recess 13B. In this state, due to the first guide rib 24A being fitted into the first engagement recess 13A and the second guide rib 24B being fitted into the second engagement recess 13B, the bus bar 10 is suppressed from rotating relative to the shielding wall 23, and the bus bar 10 can be held in the correct orientation.

Figure 12:
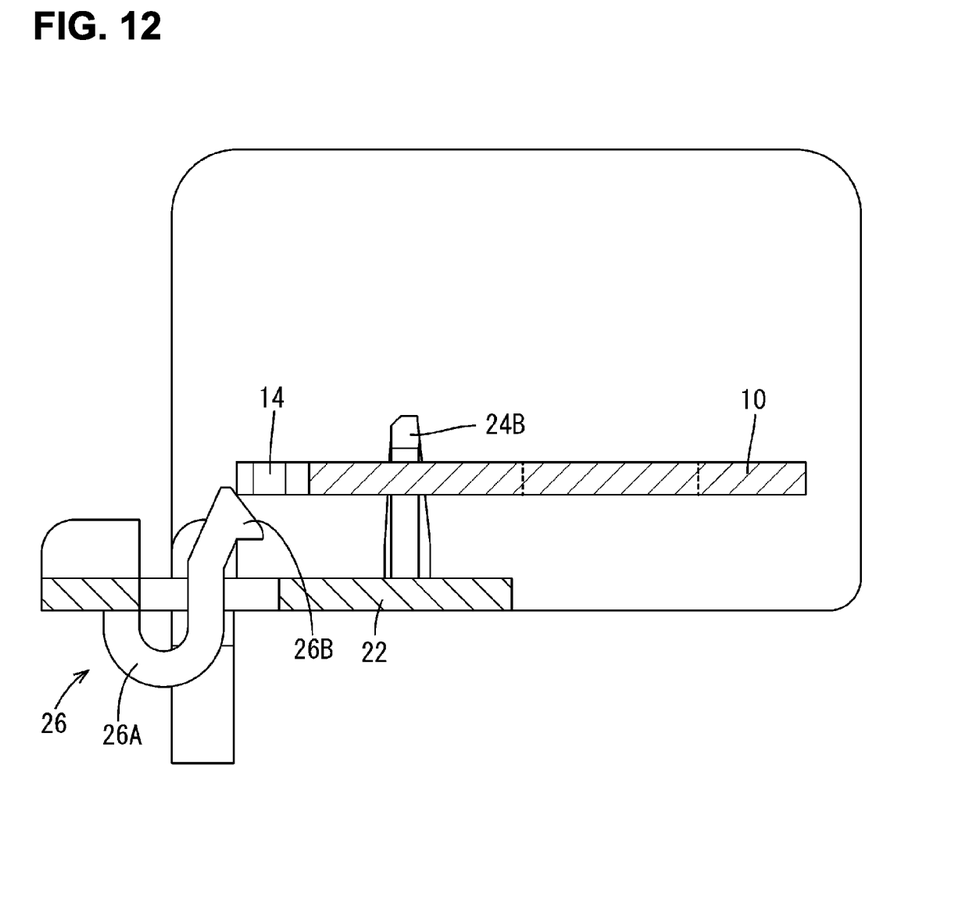
FIG. 12 is a cross-sectional view taken at the same position as the cross-sectional view taken along line A-A of FIG. 2, showing the state during attachment of the bus bar to holding member in the embodiment.

Furthermore, when the bus bar 10 is pressed in while being guided by the first guide rib 24A and the second guide rib 24B, as shown in FIG. 12, the locking protrusion 14 of the bus bar 10 comes into contact with the locking claw 26B. When the bus bar 10 is further pressed in, the bending piece 26A is bent due to the locking protrusion 14 pressing the locking claw 26B. At this time, the bending piece 26A bends easily due to being in the form of a U-shaped plate spring, and therefore the attachment task is easy.

When the bus bar 10 is further pressed in, as shown in FIG. 5, the bus bar 10 moves past the locking protrusion 27 to come into contact with the contact wall 22, and the bus bar 10 is retained due to the locking protrusion 27 engaging with the electrode connection portion 11. Also, as shown in FIG. 3, the bus bar 10 is retained due to the locking piece 26 elastically returning and the locking claw 26B engaging with the locking protrusion 14. Accordingly, the bus bar 10 is held in a retained state in the first holding unit 21A.

The bus bar 10 is attached in a similar manner in the second holding unit 21B as well, whereby the connection module 1 is completed.

The short side 11SA side of the bus bar 10 held in one holding unit (e.g., the first holding unit 21A in the center in FIG. 2) is shielded from the other bus bar 10 held in an adjacent first holding unit 21A (on the left side in FIG. 2) by the shielding wall 23 included in the first holding unit 21A. Also, the short side 11SB side is shielded from the other bus bar 10 held in the second holding unit 21B by the shielding wall 23 included in the adjacent second holding unit 21B (on the right side in FIG. 2). The long sides 11LA and 11LB are not shielded since there is no other adjacent bus bar 10. According to this kind of configuration, it is possible to shield a bus bar 10 from an adjacent bus bar 10 using the minimum required number of shielding walls 23.

SUMMARY

As described above, according to the present embodiment, the connection module 1 includes multiple bus bars 10 that connect electrode terminals of adjacent power storage elements, and holding members 20 that hold the multiple bus bars 10. The holding members 20 include multiple holding units 21A and 21B that respectively hold the multiple bus bars 10 and are arranged side by side in one line, and the holding units 21A and 21B include shielding walls 23. The shielding wall 23 included in one first holding unit 21A is provided in a standing manner along only the short side 11SA of the bus bar 10 held in the first holding unit 21A, the short side 11SA opposing the other adjacent first holding unit 21A.

As described above, in order to shield the bus bar 10 held in the one first holding unit 21A from the other bus bar 10, the shielding wall 23 need only shield only the short sides 11SA and 11SB of the bus bar 10 that oppose the other adjacent first holding unit 21A or the second holding unit 21B. According to such a configuration, compared to a configuration in which the bus bar is surrounded on four sides by a peripheral wall, it is possible to conserve the material of the holding member 20, the weight can be reduced accordingly, and the material cost can be reduced as well.

Also, one short side 11SA of the pair of short sides 11SA and 11SB of the bus bar 10 included in the one first holding unit 21A is shielded by the shielding wall 23 included in the first holding unit 21A. Also, the other short side 11SB can be shielded using the shielding wall 23 of the other first holding unit 21A or second holding unit 21B arranged adjacent thereto. This makes it possible to shield the bus bar 10 from the adjacent bus bar 10 using the minimum required number of shielding walls 23.

Also, the holding units 21A and 21B include contact walls 22 that are in contact with the bus bars 10, and locking pieces 26 and locking projections 27 that engage with the bus bars 10, the locking pieces 26 protruding from the contact walls 22 and the locking projections 27 protruding from the shielding walls 23.

According to this kind of configuration, it is possible to hold the bus bars 10 in the holding units 21A and 21B with a simple configuration.

Also, the bus bar 10 has multiple engagement recesses 13A and 13B, the holding units 21A and 21B include multiple guide ribs 24A and 24B that fit into the engagement recesses 13A and 13B and are for guiding the attachment of the bus bars 10 to the holding units 21A and 21B, one of the multiple guide ribs 24A and 24B is a first guide rib 24A that protrudes from the shielding wall 23, the other one is a second guide rib 24B that protrudes from the contact wall 22, and a height H1 of the first guide rib 24A from the contact wall 22 is higher than a height H2 of the second guide rib 24B from the contact wall 22.

According to this kind of configuration, it is possible to smoothly attach the bus bars 10 to the holding units 21A and 21B by first positioning and guiding the bus bar 10 using the first guide rib 24A and the shielding wall 23, and then performing guiding while suppressing rotation of the bus bar 10 using the second guide rib 24B.

MODIFIED EXAMPLE

Figure 13:
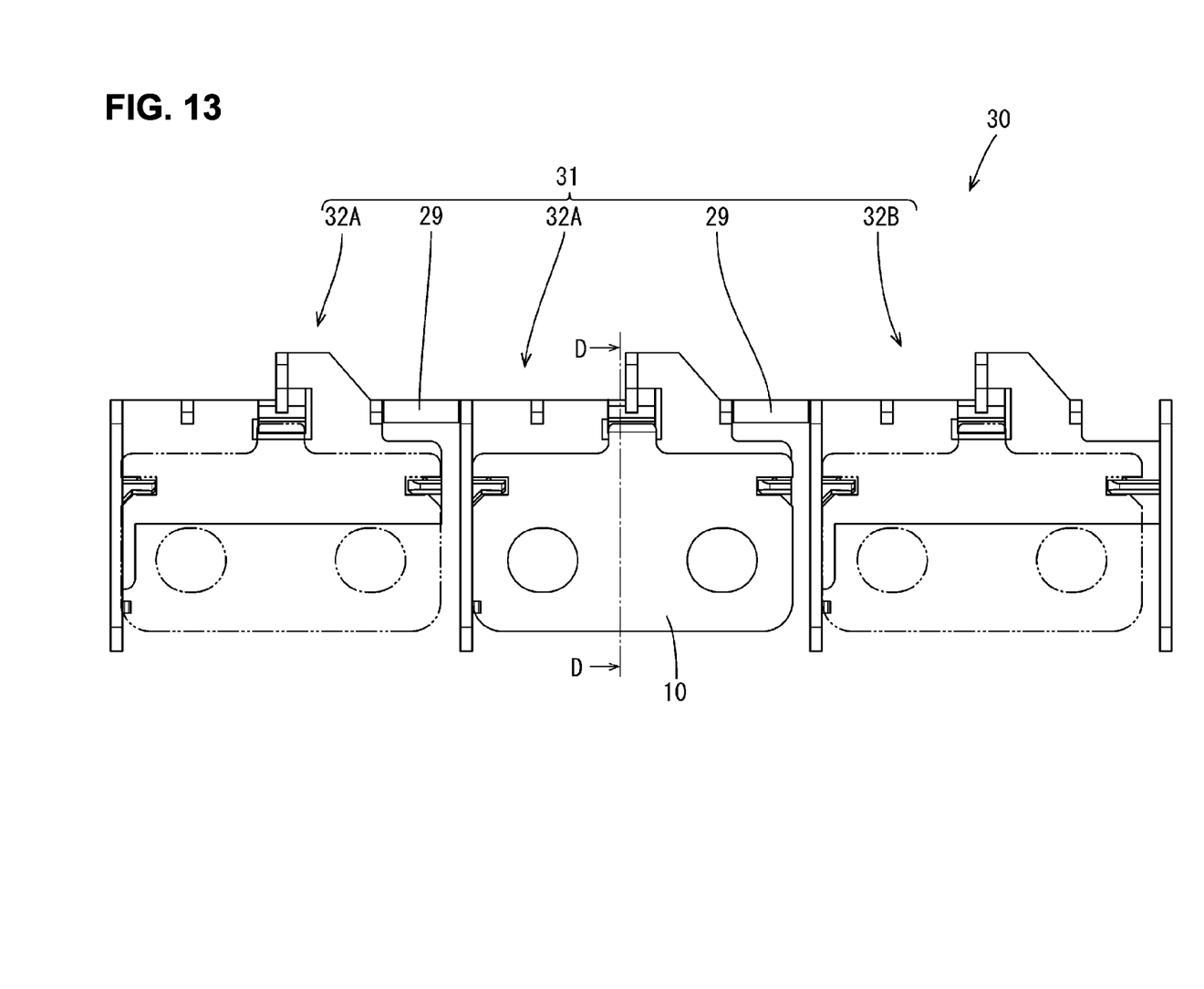
FIG. 13 is a plan view of a connection module of a modified example.
Figure 14:
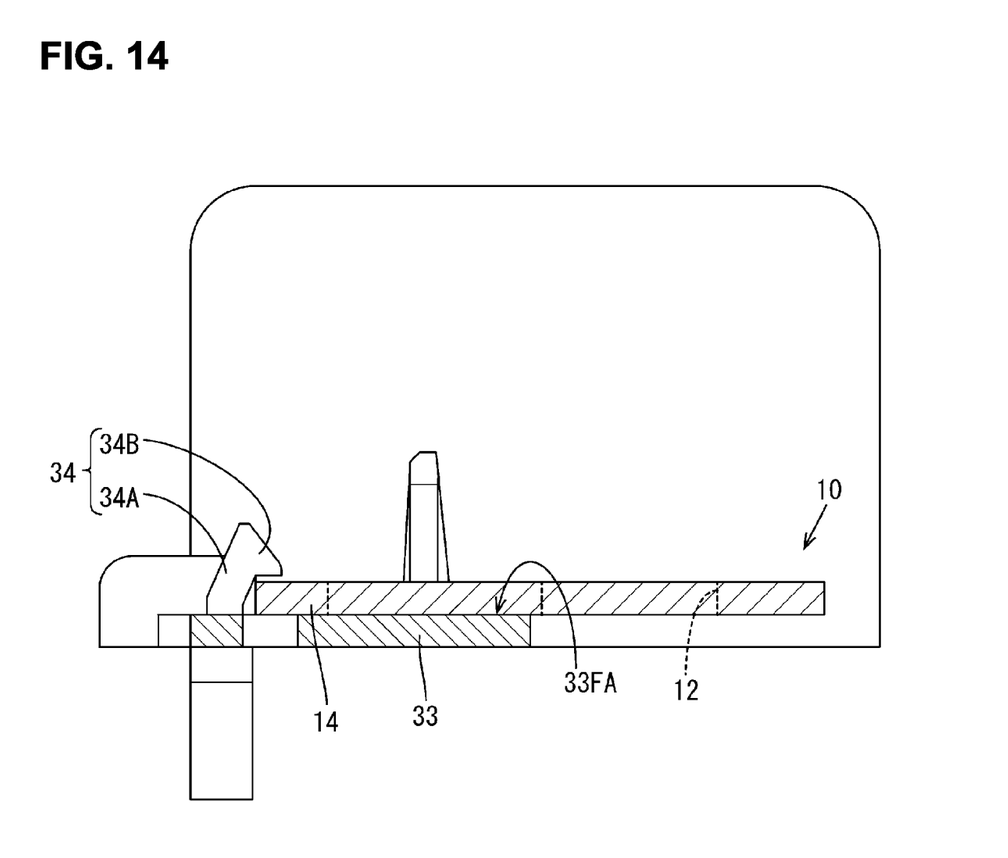
FIG. 14 is cross-sectional view taken along line D-D of FIG. 13.

A modified example will be described with reference to FIGS. 13 and 14. A connection module 30 of the present modified example differs from that of the above-described embodiment in the shape of the locking piece 34 (corresponds to a locking portion) included in the holding member 31.

The holding member 31 of the modified example includes multiple first holding units 32A (corresponds to a holding unit) and a second holding unit 32B (corresponds to a holding unit), similarly to the embodiment. The first holding unit 32A includes a contact wall 33 and a locking piece 34 (corresponds to a locking portion) that extends from the contact wall 33, similarly to the first embodiment. The contact wall 33 has the same configuration as in the embodiment, except for details such as not having the locking piece insertion hole 25. The locking piece 34 includes a bending piece 34A in the form of a plate spring that extends from the contact surface 33FA of the contact wall 33 that comes into contact with the bus bar 10, and a locking claw 34B that protrudes from the extending edge of the bending piece 34A and locks onto the bus bar 10.

The same applies also to the second holding unit 32B.

In the present modified example as well, when the bus bar 10 is pressed in toward the contact wall 33, the bending piece 34A is bent due to the locking protrusion 14 pressing the locking claw 34B. When the bus bar 10 is further pressed in, the bus bar 10 moves past the locking protrusion 27 to come into contact with the contact wall 22, and as shown in FIG. 14, the bus bar 10 is retained due to the locking piece 34 elastically returning and the locking claw 34B engaging with the locking protrusion 14.

Other configurations are the same as those of the above-described embodiment, and therefore the same configurations are denoted by identical reference numerals and description thereof is omitted.

OTHER EMBODIMENTS

The technique disclosed by the present specification is not limited to the embodiments described in the above description and drawings, and for example, the following various modes are also encompassed therein.

(1) The number of connection members can be set as appropriate according to the number of power storage elements. The number of holding units can also be set as appropriate according to the number of connection members.

(2) In the above-described embodiment, the shielding wall 23 included in the first holding unit 21A was provided in a standing manner along only one short side 11SA of the bus bar 10, but the shielding walls included in the first holding unit may also be provided in a standing manner along both of a pair of opposing edges of a connection member.

LIST OF REFERENCE NUMERALS

1, 30 Connection module
10 Bus bar (connection member)
11SA, 11SB Short side (opposing edge)
13A First engagement recess (engagement recess)
13B Second engagement recess (engagement recess)
20 Holding member
21A, 32A First holding unit (holding unit)
21B, 32B Second holding unit (holding unit)
23 Shielding wall
22, 33 Contact wall
24A First guide rib (guide rib)
24B Second guide rib (guide rib)
25, 34 Locking piece (locking portion)
27 Locking projection (locking portion)

The invention claimed is:

1. A connection module to be attached to a plurality of power storage elements including electrode terminals, the connection module comprising:
a plurality of connection members for connecting adjacent said electrode terminals; and
a holding member that holds the plurality of connection members,
wherein the holding member includes a plurality of holding units that respectively hold the plurality of connection members and are arranged side by side in one line,
the holding units each include a shielding wall, and
the shielding wall included in one said holding unit is provided in a standing manner along only an opposing edge of one said connection member held in the one holding unit, the opposing edge opposing another said holding unit adjacent thereto.

2. The connection module according to claim 1,
wherein the shielding wall included in the one holding unit is provided in a standing manner along only one of a pair of the opposing edges of the one connection member, the opposing edges opposing the other holding units arranged on both sides of the one holding unit.

3. The connection module according to claim 1,
wherein the holding unit includes a contact wall that is in contact with the connection member, and a plurality of locking portions that engage with the connection member, and
one of the plurality of locking portions protrudes from the contact wall, and another one protrudes from the shielding wall.

4. The connection module according to claim 3,
wherein the connection member has a plurality of engagement recesses,
the holding unit includes a plurality of guide ribs that fit into the engagement recesses and guide attachment of the connection member to the holding unit,
one of the plurality of guide ribs is a first guide rib that protrudes from the shielding wall, and another one is a second guide rib that protrudes from the contact wall, and
a height of the first guide rib from the contact wall is higher than a height of the second guide rib from the contact wall.

5. The connection module according to claim 1, wherein the shielding walls each extend only in parallel with each other.

6. The connection module according to claim 1, wherein the connection members have a rectangular shape, including a pair of long sides and a pair of short sides, and the shielding wall is provided to extend only along one of the short sides of each of the respective connection members.

* * * * *